United States Patent [19]

Hayashi et al.

[11] Patent Number: 4,991,728

[45] Date of Patent: Feb. 12, 1991

[54] BLOW-MOLDED BOTTLE-SHAPED CONTAINER OF BIAXIALLY ORIENTED POLYETHYLENE TEREPHTHALATE AND PIECE TO BE BLOW-MOLDED INTO THE SAME BOTTLE-SHAPED CONTAINER

[75] Inventors: Yoshiaki Hayashi; Takuzo Takada, both of Tokyo, Japan

[73] Assignee: Yoshino Kogyosho Co., Ltd., Tokyo, Japan

[21] Appl. No.: 378,909

[22] Filed: Jul. 12, 1989

Related U.S. Application Data

[60] Division of Ser. No. 222,334, Jul. 20, 1988, which is a continuation of Ser. No. 62,407, Jun. 15, 1987, abandoned, which is a continuation of Ser. No. 780,723, Sep. 27, 1985, abandoned, which is a continuation of Ser. No. 592,748, Mar. 23, 1984, abandoned, which is a continuation of Ser. No. 413,560, Aug. 31, 1982, abandoned.

[30] Foreign Application Priority Data

Sep. 2, 1981 [JP] Japan .................. 56-130590

[51] Int. Cl.⁵ .................. B65D 1/02; B65D 23/00; B29B 11/14
[52] U.S. Cl. .................. 215/1 C; 215/31; 428/36.92; 428/542.8
[58] Field of Search ............ 215/1 C, 31; 428/542.8, 428/35.7, 36.92; 264/25, 520, 521, 523, 532, 535, 537, 538, 592, 748

[56] References Cited

U.S. PATENT DOCUMENTS

| | | | |
|---|---|---|---|
| 3,900,120 | 8/1975 | Sincock | 215/1 C |
| 3,934,743 | 1/1976 | McChesney et al. | 215/1 C |
| 4,025,594 | 5/1977 | Agrawal | 264/521 |
| 4,164,298 | 8/1979 | Nishikawa et al. | 215/1 C |
| 4,232,022 | 11/1980 | Brady et al. | 215/1 C X |
| 4,256,789 | 3/1981 | Suzuki et al. | 428/36.92 |
| 4,320,083 | 3/1982 | Jakobsen | 215/1 C X |
| 4,379,099 | 4/1983 | Ota et al. | 264/25 |
| 4,406,854 | 9/1983 | Yoshino | 215/1 C X |

FOREIGN PATENT DOCUMENTS

| | | | |
|---|---|---|---|
| 2141755 | 3/1973 | Fed. Rep. of Germany | 264/533 |
| 54-68385 | 6/1979 | Japan | 264/532 |
| 57-08123 | 1/1982 | Japan | 264/523 |
| 2041286 | 9/1980 | United Kingdom | 215/1 C |
| 2066725 | 7/1981 | United Kingdom | 264/532 |

Primary Examiner—Sue A. Weaver
Attorney, Agent, or Firm—Oliff & Berridge

[57] ABSTRACT

A hollow, blow-molded, bottle-shaped container of a biaxially oriented polyethylene terephthalate which has a stepped portion formed on the inner peripheral surface of a boundary between a neck portion and a shoulder portion with a body portion, and crystallized by a heat treatment before being biaxially oriented blow-molded from an injection-molded primary piece or parison, thereby abruptly reducing the thickness of the wall at the boundary from the neck portion to the shoulder portion to substantially equal the thickness of the body portion. This bottle-shaped container is manufactured from an injection-molded preformed piece or parison in which a recess groove is formed on the peripheral surface of the shoulder forming portion. Thus, any deterioration in the physical properties of the neck and shoulder portions of the bottle-shaped container can be eliminated.

4 Claims, 3 Drawing Sheets

BLOW-MOLDED BOTTLE-SHAPED CONTAINER OF BIAXIALLY ORIENTED POLYETHYLENE TEREPHTHALATE AND PIECE TO BE BLOW-MOLDED INTO THE SAME BOTTLE-SHAPED CONTAINER

This is a division of application Ser. No. 222,334 filed Jul. 20, 1988 which in turn is a continuation of application Ser. No. 062,407 filed Jun. 15, 1987, abandoned, which in turn is a continuation of application Ser. No. 780,723 filed Sep. 27, 1985, abandoned, which in turn is a continuation of application Ser. No. 592,748 filed Mar. 23, 1984, abandoned, which in turn is a continuation of application Ser. No. 413, 560 filed Aug. 31, 1982, abandoned.

BACKGROUND OF THE INVENTION

This invention relates to a hollow, blow-molded, bottle-shaped container of a biaxially oriented polyethylene terephthalate resin and a piece or parison to be blow-molded into the same bottle-shaped container.

Since a blow-molded, bottle-shaped container of biaxially oriented polyethylene terephthalate resin, (hereinafter referred to as "a PET"), has a number of excellent physical properties and characteristics, it has a wide range of applications.

Some of the excellent physical properties of a bottle-shaped container of a PET can be realized once the bottle-shaped container has been biaxially oriented and blow-molded. The bottle-shaped container of the PET has heretofore been produced for its physical properties by the steps of injection-molding a piece or parison, as a primary or prefabricated molded piece, and then biaxially orienting the primary piece or parison, by the so-called injection blow-molded method. The neck portion of the bottle-shaped container used as a mounting portion for a blowing mold, has not entirely been oriented but has been molded from the primary piece or parison to the hollow, blow-molded, bottle-shaped container. In this manner, the shoulder portion, continues with the neck portion of the bottle-shaped container, has not been sufficiently oriented by the injection blow-molded method. Accordingly, the neck portion and the shoulder portion of the bottle-shaped container cannot exhibit the excellent physical properties of the PET prepared by the biaxially blow-molding method.

The drawbacks and disadvantages of the bottle-shaped container, thus blow-molded at the neck and shoulder portions which have not been subjected to or sufficiently subjected to an orientation are, for example, a crazing which occurs due to the impregnation of alcohol in high density to the bottle-shaped container, a feasibility of various deformations and strains including elongation due to a lack of sufficient hardness of the bottle-shaped container, and a low thermal resistance due to the occurrence of thermal deformation taking place when a content liquid is filled at high temperature in the bottle for the purpose of sterilization. More concretely the neck portion and the shoulder portion of the conventional bottle-shaped container, thus blow-molded, has such drawbacks and disadvantages that, when high internal pressure is applied to the bottle-shaped container, as when a carbonated drink mixed with fruit juice is entered into the container by a hot charging process, the shoulder portion, molded without being subjected to sufficient orientation, becomes axially elongated and deformed by the internal pressure.

SUMMARY OF THE INVENTION

Accordingly, an object of the present invention is to provide a hollow, blow-molded, bottle-shaped container of a biaxially oriented polyethylene terephthalate resin which can eliminate all the aforementioned drawbacks and disadvantages encountered with the conventional bottle-shaped container and which has less deterioration in the physical properties of the neck and shoulder portions thereof.

Another object of the present invention is to provide a hollow-blow-molded, bottle-shaped container of a biaxially oriented polyethylene terephthalate resin in which the neck portion is crystallized to have a sufficient hardness, and the shoulder portion is sufficiently oriented in the blow-molding, thereby eliminating a crazing which occurs when alcohol in high density is impregnated into to the bottle-shaped container.

A further object of the present invention is to provide a hollow, blow-molded, bottle-shaped container of a biaxially oriented polyethlene terephthalate resin in which the mechanical strength and chemical resistance can be enhanced.

Still another object of the present invention is to provide a hollow, blow-molded, bottle-shaped container of a biaxially oriented polyethylene terephthalate resin in which at the neck portion has the same uniform physical properties as the body of the bottle-shaped container, thereby eliminating the axial elongation of the shoulder portion caused by internal pressure being applied to the container and the deterioration in the thermal resistance at the shoulder portion thereof.

Still another object of the present invention is to provide a hollow, blow-molded, bottle-shaped container of a biaxially oriented polyethylene terephthalate resin in which the excellent physical properties of the polyethylene terephthalate resin can be entirely realized.

Still another object of the invention is to provide a piece or parison to be blow-molded into a hollow, blow-molded, bottle-shaped container of a biaxially oriented polyethylene terephthalate resin having a stepped portion on the inner peripheral surface of a boundary between the neck and the shoulder portions for strengthening the shoulder portion.

BRIEF DESCRIPTION OF THE DRAWINGS

The above and other related objects and features of the invention will be apparent from a reading of the following description of the disclosure found in an accompanying drawings and novelty thereof pointed out in the appended claims.

DESCRIPTION OF THE PREFERRED EMBODIMENTS

Figure 1:
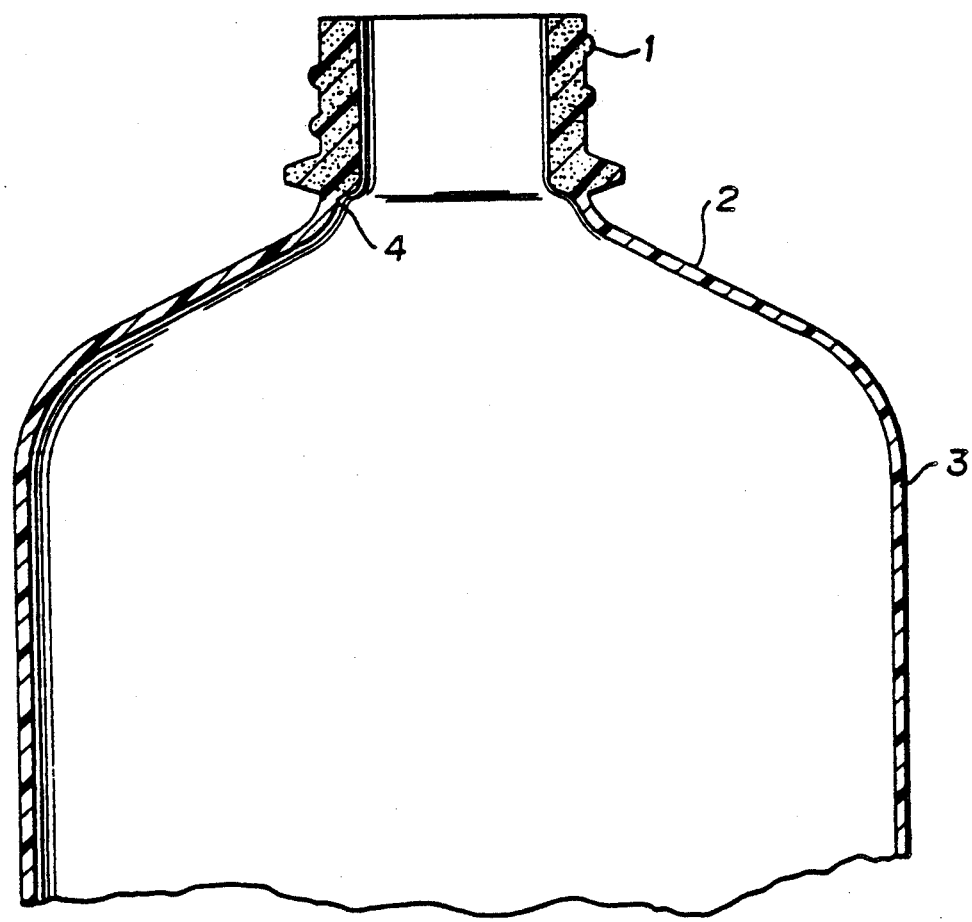
FIG. 1 is a sectional view of the neck portion of a bottle-shaped container according to an embodiment of the present invention.

The present invention will now be described in more detail with reference to the accompanying drawing.

A hollow, blow-molded, bottle-shaped container of a biaxially oriented polyethylene terephthalate resin (PET) according to the present invention includes, similarly to the conventional bottle-shaped container of this type, a cylindrical body 3 with a bottom, a tapered cylindrical wall-shaped shoulder portion 2 integrally formed from the upper end of the body 3, and a neck portion 1 located on the upper end of the shoulder portion 2.

According to the present invention, the neck portion 1 of the bottle-shaped container is already crystallized by a predetermined heat treatment occurring before a primary preformed piece or parison is prepared by biaxially oriented injection molding, in a blow molding and hence in the same state as the primary preformed piece or parison. The shoulder portion 2 of the bottle-shaped container has a sufficient axial orientation so that the thickness of its wall becomes substantially equal to that of the body 3 over the entire shoulder area. Further, in order that the thickness of the shoulder portion 2 is formed to be substantially equal to that of the body 3, a stepped portion 4 is formed on the inner peripheral surface of the boundary between the neck portion 1, having a large thickness, and the shoulder portion 2, thereby abruptly reducing the thickness of the wall at the boundary between the neck portion 1 and the shoulder portion 2.

According also to the present invention is a method of manufacturing a hollow, bottle-shaped container of a biaxially oriented polyethylene terephthaltate resin, having the stepped portion on the inner peripheral surface of the boundary between the neck and the shoulder portions, the stepped portion 4 being formed by sufficiently orienting the shoulder portion 2 in the blow molding, crystallizing the neck portion 1 of the PET material so that it is not entirely oriented nor deformed, and blow-molding radially the shoulder portion 2 and the body 3 of the bottle-shaped container.

The bottle-shaped container of the structure described above is manufactured, similar to the conventional biaxial orientation blow molding method, by biaxially orienting a primary performed piece or parison, prepared by an injection molding. However, in the present invention, the neck portion of the primary injection-molding piece or parison is heat treated prior to the biaxial orientation blow molding, thereby crystallizing the neck portion prior to the blow molding step.

Further, in order to smoothly impart an orientation blow molding to the portion of the injection-molded piece or parison to be formed with the shoulder portion 2 it is preferred that the thickness of the wall of the portion directly under the neck portion, of the piece or parison, thus crystallized, smaller than the other portion, so as to concentrate the orientation force applied when axially orienting the piece or parison in the blow molding, to the portion directly under the neck portion of the piece or parison.

The piece or parison thus constructed will now be described in more detail according to the preferred embodiments of the present invention referenced in FIGS. 2 and 3. In the piece or parison P, a shoulder forming portion 2a is the boundary portion between a body forming portion 3a and the neck portion 1 and is formed sufficiently thin as compared with the body forming portion 3a.

Further, the neck portion 1 is crystallized by a predetermined heat treatment prior to the biaxial orientation blow-molding of the piece or parison P into a bottle-shaped container.

Figure 2:
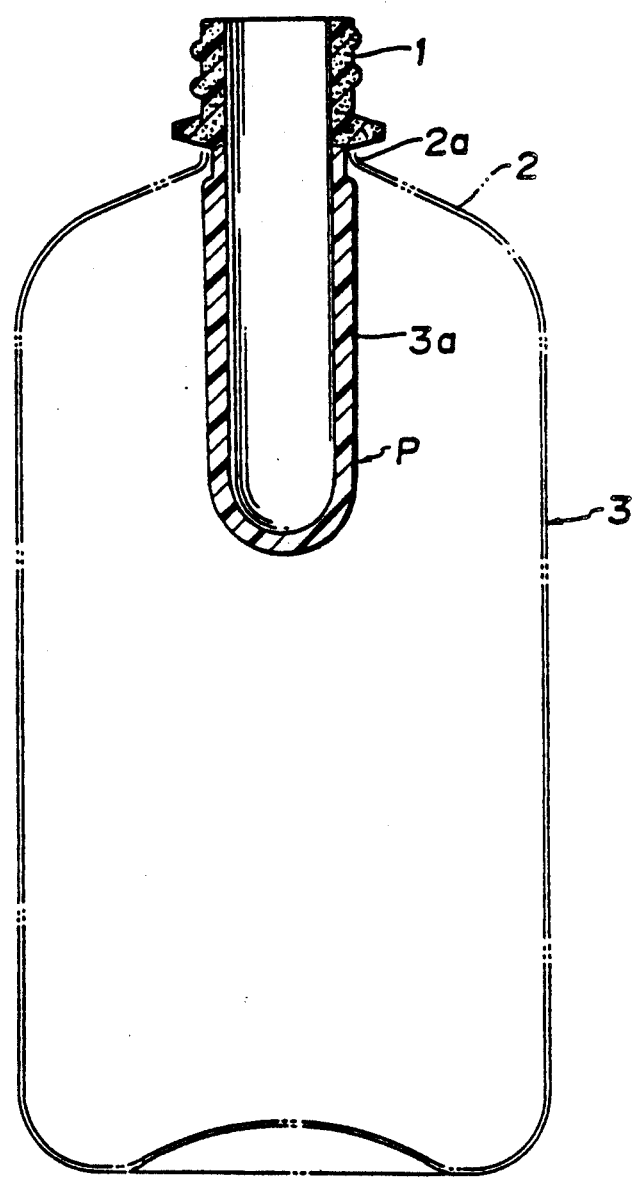
FIG. 2 is a sectional view of a piece or parison to be blow-molded into the bottle-shaped container according to another embodiment of the present invention.
Figure 3:
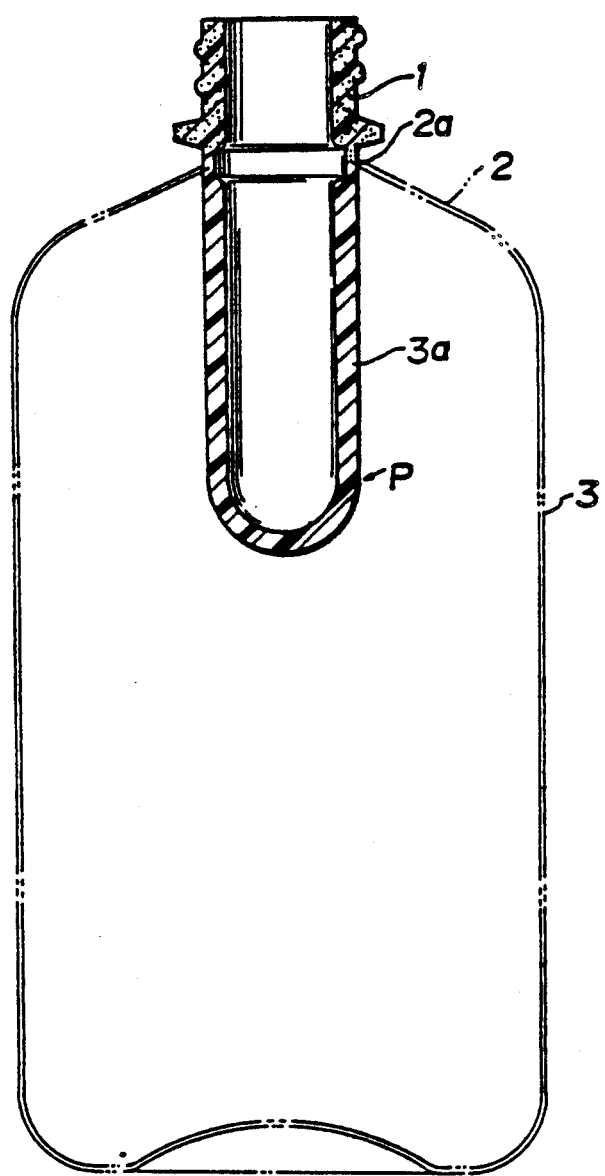
FIG. 3 is a sectional view of a piece or parison to be blow-molded into the bottle-shaped container according to still another embodiment of the present invention.

In the piece or parison P in which the thickness of the shoulder forming portion 2a is reduced, a recess groove may be formed on the outer peripheral surface of the shoulder forming portion 2a as shown in FIG. 2, or a recess groove is formed on the inner peripheral surface of the shoulder forming portion 2a of the piece or parison P as shown in FIG. 3. For the preferred structure of an injection molding die for the piece or parison P, the recess groove is formed on the outer peripheral surface of the shoulder forming portion 2a, of the piece or parison P, as shown in FIG. 2.

As described above, when the portion directly under the neck portion of the piece or parison thus crystallized is reduced in thickness, an orientation force applied when axially orienting the piece or parison is concentrated at the thinned or stepped portion thus formed, thereby orienting in advance the thinned portion of the piece or parison in the blow molding.

The orientation blow-moding of the thinned portion of the injection-molded piece or parison, by a predetermined amount, will be completed much earlier than the time when the piece or parison is entirely oriented and blow-molded. Accordingly, the axial orientation blow-molding of the piece or parison is subsequently continued for the portions other than the thinned portion of the piece, even though the orientation blow-molding of the thinned portion has been completed.

While the thinned portion of the piece is orientation blow-molded, the other portions of the piece are simultaneously orientation blow-molding. In this case, the thinned portion of the piece is oriented much faster in the orientation quantity per unit time than the other portions. Accordingly, the orientation amount of the thinned portion can be reached much earlier than the predetermined quantity of the other portions of the piece.

As described above, the orientation blow-molding is at first concentrated at the portion directly under the neck portion of the piece or parison. However, the neck portion is already heat treated to be crystallized. Accordingly, the neck portion thus crystallized is not oriented at all, therefore the intermediate portion between the neck portion and the portion directly under the neck portion, is abruptly varied or reduced in thickness, resulting in the formation of a stepped portion at the boundary between the neck portion and the portion directly under it.

Subsequent to or simultaneously upon axial orientation blow-molding of the piece or parison, compressed air is introduced into the hollow piece or parison or radially orient the piece, thus completely biaxially orienting the piece into a bottle-shaped container. When the piece is radially blow-molded, the portion to be formed into a shoulder portion 2 of the piece is also externally subjected to an orientation force. In this manner, the stepped portion 4 formed between the neck portion 1 and the shoulder portion 2 of the piece is only formed on the inner peripheral surface side of the bottle-shaped container.

In the embodiment described above, the bottle-shaped container of the present invention is manufactured by crystallizing the neck portion 1 of the injection-molded piece or parison. Therefore, the bottle-shaped container of the present invention has sufficient hardness at the neck portion and will not be susceptible to crazing caused by the impregnation of alcohol in high denisity into the bottle-shaped container. The shoulder portion 2 of the bottle-shaped container is thus subjected to sufficient orientation. Accordingly, the shoulder portion 2 can exhibit the similar physical properties as the orientation blow-molded body 3.

As evident from the foregoing description, the bottle-shaped container of the present invention has the neck portion 1 crystallized to enhance its mechanical strength and chemical resistance and the container's shoulder portion 2 oriented to the same amount as the body 3. Therefore, the body of the bottle-shaped container and the neck portion 2 have the same uniform physical properties. Thus, the shoulder portion 2 of the bottle-shaped container of the invention is not axially oriented or deformed by the action internal pressured applied to the container. Further, the drawback of the shoulder portion 2 deteriorating because of thermal resistance can be eliminated, and the excellent properties of the polyethylene terephthalate resin can be entirely effectuated by the bottle-shaped container of the present invention.

What is claimed is:

1. A hollow blowmolded container of a biaxially oriented polyethylene terephthalate resin, comprising:
    a cylindrical walled body having a wall thickness;
    a tapered cylindrical walled shoulder portion integrally formed from and upper end of said body and having a wall thickness substantially equal to said wall thickness of said body;
    a cylindrical walled neck portion integrally formed on an upper end of said shoulder portion and having a wall thickness substantially greater than said wall thickness of said shoulder portion with an abrupt transition between said wall thickness of said shoulder portion and said wall thickness of said neck portion; and
    a stepped portion formed on an inner peripheral surface of a boundary between said neck portion and said shoulder portion, said stepped portion having been formed by biaxially blow-molding a parison having a crystallized neck portion, a body forming portion and a shoulder forming portion extending between said neck portion and said body forming portion and being sharply thinner than both said body forming portion and said neck portion, said neck portion of the parison being crystallized to a point immediately adjacent an upper end of said shoulder forming portion by a predetermined heat treatment.

2. An injection molded parison for manufacturing a hollow blow-molded bottle-shaped container of biaxially oriented polyethylene terephthalate resin, comprising:
    a neck portion, a substantially cylindrical body forming portion, and a shoulder forming portion, said shoulder forming portion extending between said neck portion and said body forming portion;
    said shoulder forming portion being sharply thinner than both said body forming portion and said neck portion and being in the form of a stepped groove in said parison at a boundary between said neck portion and said body forming portion;
    said neck portion being crystallized to a point immediately adjacent an upper end of said shoulder forming portion by a predetermined heat treatment.

3. The parison according to claim 2, wherein said groove is formed in an external surface of said parison.

4. The parison according to claim 2, wherein said groove is formed in an internal surface of said parison.

* * * * *